Patented Oct. 30, 1951

2,573,394

UNITED STATES PATENT OFFICE 2,573,394

PROCESS FOR THE MANUFACTURE OF CHLORINATED DERIVATIVES OF ALPHA-CHLOROETHYLBENZENE

Eugen Gottfried Galitzenstein, Wallington, and Cyril Woolf, London, England, assignors to The Distillers Company, Limited, Edinburgh, Scotland, a British company No Drawing. Application December 3, 1946, Serial No. 713,853. In Great Britain December 18, 1945

6 Claims. (Cl. 260—651)

The present invention is for improvements in or relating to the manufacture of chlorinated derivatives of alpha-chloro-ethylbenzene.

So far as we are aware, the chlorination of alpha-chloroethyl benzene has never been described. Attempts which we made to chlorinate it with the aid of the customary chlorination catalysts, such as ferric chloride, antimony pentachloride and the like, failed completely to furnish the desired results, because these catalysts caused elimination of hydrogen chloride from the side chain, thus forming styrene with the resultant formation of resinous products.

According to the present invention there is provided a process for the manufacture of chlorinated derivatives of alpha-chloroethyl benzene which comprises reacting alpha-chloroethyl benzene or a nuclear-chlorine substitution product thereof in the liquid phase with gaseous chlorine at a temperature not exceeding 130° C. in the presence of iodine as chlorination catalyst. The iodine catalyst may be formed in situ in the reaction mixture from an iodine compound, e. g. iodoform or ethyl iodide. About 0.12–0.5% of iodine calculated on the alpha-chloroethylbenzene or the nuclear chlorine substitution product has been found to give satisfactory results. By the process according to the present invention chlorine reacts readily with the alpha-chloro ethylbenzene or the nuclear chlorine substitution product thereof and without any substantial formation of resinous matter as was the case when using the customary anhydrous metal chloride chlorination catalysts.

Reaction of one molecule of chlorine can in addition to or instead of reacting with the side chain theoretically give rise to the following nuclear chlorination products (neglecting positional isomers):

(i)
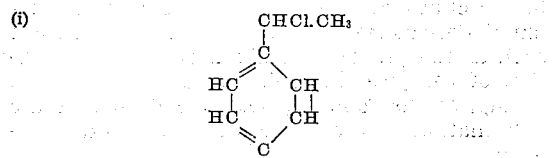

and (ii)
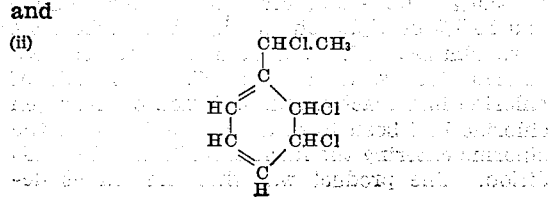

Similarly, reaction of two molecules of chlorine can in addition to or instead of reacting with the side chain theoretically give rise to the following nuclear chlorination products (again neglecting positional isomers):

(iii)
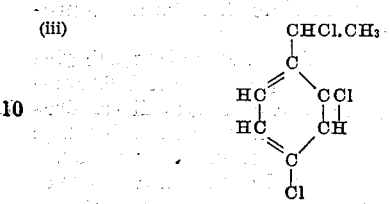

(iv)
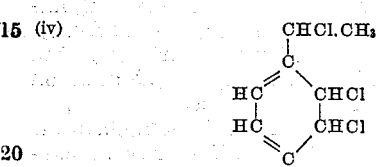

and (v)
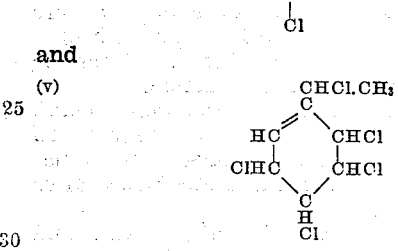

and so on.

Compounds of the type (ii), (iv) and (v) are hereinafter referred to as "chloro-addition compounds."

A feature of the invention consists in that the chloro-addition compounds are separated from the reaction mixture, and subjected to pyrolytic decomposition to eliminate hydrogen chloride from the nucleus. Preferably the pyrolytic decomposition is effected at a temperature of 180° to 300° C. preferably at a reduced pressure of 50 to 200 mms. of mercury.

The chlorination process of our invention, can be carried out within a very wide range of temperature. We prefer, however, to carry out the process at temperatures of between —10° and 130° C. since at temperatures below —10° C. the reaction velocity is slow, whilst above 130° C. undesirable side reactions occur.

On investigating the process of our invention we have discovered furthermore that the chlorinated compounds resulting from the chlorination process vary fundamentally according to the temperatures at which the chlorination process is carried out. By working at temperatures between —10° C. and +30° C. the chlorine reacts almost exclusively with the benzene nucleus, part of the chlorine entering by substitution, with consequent liberation of hydrogen chloride, whilst concurrently with this chloro-substitution, another part of the chlorine reacts with the benzenoid ring by simple addition to the double bonds thereof to form chloro-addition compounds. The extent of formation of these chloro-addition compounds is diminished at increasing temperatures of chlorination.

When, on the other hand, the chlorination according to our invention is carried out at temperatures of between 90° and 130° C., chlorine enters exclusively into the alpha-chloroethyl side chain. By chlorinating at intermediate temperatures of between 30–90° C. mixtures of nuclear- and side-chain-chlorinated products are formed.

It is therefore possible by employing temperatures of between —10° C. and 30° C. during the chlorination process to obtain a mixture of nuclear chloro-derivatives of alpha-chloroethyl-benzene, whilst by working at 90–130° C. derivatives of alpha-chloroethylbenzene, or of nuclear chlorine substitution products thereof, which are chlorinated in the side chain are produced.

Normal ring-substitution chlorination will give rise to products such as alpha-chloroethylmonochlorobenzene, alpha - chloro - ethyl - di - chloro-benzene and alpha-chloroethyl-trichlorobenzene according to the quantity of chlorine employed.

At the same time, ring-chlorinated derivatives of alpha-chloroethyl cyclohexadiene, alpha-chloroethyl cyclohexene and alpha-chloroethyl cyclohexane are produced when working within the lower temperature range by simple addition of chlorine to the benzenoid nucleus.

The chlorination of alpha-chloroethylbenzene in accordance with this invention may be carried out in the presence of solvents which are inert to the action of chlorine. The use of a polar solvent, such as nitrobenzene, reduces the extent of the chloro-addition reaction.

After completion of the chlorination process, the iodine may be removed from the reaction product in any convenient manner, for instance by the action of powdered activated charcoal or sodium thiosulphate.

The unchanged alphachloroethylbenzene and its lower substitution products such as alpha-chloroethyl monochlorobenzene and alpha-chloroethyl dichlorobenzene produced by chlorinating at temperatures of —10° to 30° C. may be separated one from the other and from the chloro-addition compounds and higher substituted chlorination products by fractional distillation at reduced pressure.

We have found that the chloro-addition compounds revert to the benzenoid structure on heating to temperatures between 180–300° C. preferably at pressures of 50–200 mm. mercury, as a result of the elimination of hydrogen chloride from the nucleus of the chloro-addition compounds. There is also a partial elimination of hydrogen chloride from the alpha-chloroethyl group of alpha-chloroethyl-trichlorobenzene and higher chlorosubstituted derivatives of alpha-chloroethylbenzene which may be present in the reaction mixture or formed during the pyrolytic reaction.

The following examples illustrate various ways in which the invention may be carried into effect, the percentages quoted being by weight unless otherwise stated:

*Example I.*—A current of chlorine was passed into 787.2 g. (5.27 mols.) of alphachloroethyl-benzene containing 0.2% of iodine dissolved therein. The liquid was vigorously stirred and maintained at 20° C. by external cooling. After 10 hours, 7.817 mols. of chlorine had reacted with the formation of 5.896 mols. of hydrogen chloride. Of the total chlorine which had entered the nucleus, 39% by volume had entered by addition. The reaction mixture was shaken with powdered decolourising carbon to remove dissolved iodine. After filtering off the carbon, the chlorination product was then slowly dropped into a heated still attached to a short fractionating column. A pressure of 90 mm. mercury was maintained in the apparatus, the kettle temperature being kept at 220° to 250° C. The liquid was distilled continuously from the kettle together with hydrogen chloride gas, and the rate of feed was adjusted to the same speed as that of distillation. All the liquid had distilled in three hours and 2.584 mols. of hydrogen chloride were evolved, some 15 g. of resin remaining in the still. During this stage, some combined iodine which was chemically-bound was liberated, and this was removed from the distillate by shaking with decolourising carbon. The product was then fractionated at 9 mm. mercury pressure. The distilled liquid had a molecular composition, expressed as percentages given in the last column of the following table:

| Fraction | Boiling point/9 mm. | Per Cent |
|---|---|---|
|  | *Degrees* |  |
| Unchanged alpha-chloroethylbenzene | 65–74 | 9.1 |
| Alpha-chloroethyl-monochlorobenzene | 74–94 | 59.0 |
| Alpha-chloroethyl-dichlorobenzene | 94–120 | 23.6 |
| Trichlorostyrene | 94–120 | 3.4 |
| Alpha-chloroethyl trichlorobenzene | Residue | 4.9 |

*Example II.*—706 g. (5.03 mols.) of alpha-chloroethylbenzene were chlorinated in the presence of 3.3 g. of iodine until 11.56 mols. of chlorine had reacted, 9.15 mols. of hydrogen chloride being formed. Reaction was carried out at 20° C. for the first 8 hrs. and at 30° C. for a further 3 hrs. The product was then treated as described in Example I. The products obtained are set out in the following table, each expressed as a molecular percentage of total products obtained:

|  | Per cent |
|---|---|
| alpha-chloroethylbenzene | 4.7 |
| Alpha-chloroethyl monochlorobenzene | 9.9 |
| Alpha-chloroethyl dichlorobenzene | 42.2 |
| Alpha-chloroethyl trichlorobenzene | 20.8 |
| Trichlorostyrene | 22.4 |

The process of the invention is also applicable to the chlorination of the lower nuclear-chlorinated derivatives of alpha-chloroethyl benzene such as the products obtained by the fractionation of the products obtained in the foregoing examples; the following example illustrates the chlorination of these nuclear-chlorinated products:

*Example III.*—424 g. of a mixture consisting of 85.5% alpha-chloroethyl monochlorobenzene and 14.5% of alpha-chloroethyl-dichlorobenzene were admixed with 0.5 g. iodine and treated with chlorine for five hours at 20° C. 1.154 mols. of chlorine had reacted and 0.74 mol. of hydrogen chloride had been formed. Hence 47.3% of the chlorine entering the nucleus had reacted by addition. The product was then treated as described in Example I, with the following result, expressed as molecular percentages of the total products.

| | Mols | Per cent |
|---|---|---|
| Unchanged alpha-chloroethyl monochlorobenzene | 1.320 | 56.2 |
| Alpha-chloroethyl-dichlorobenzene | 0.759 | 32.3 |
| Residue of alpha-chloroethyltrichlorobenzene | 0.270 | 11.5 |
| | 2.349 | 100.0 |

*Example IV.*—843 g. (6.00 mols.) of alpha-chloroethylbenzene were chlorinated at 95° C. in the presence of 2.17 g. of iodine. After 8 hrs. 9.93 mols of chlorine had reacted, whilst 9.90 mols. of hydrogen chloride were liberated. The product was distilled at 7 mm. to give the following different fractions of side-chain-chlorinated ethylbenzenes.

| Fraction | Boiling point/7 mm. | Yield |
|---|---|---|
| | Degrees | Grams |
| Dichloroethyl-benzene | 85–90 | 453 |
| Trichloroethyl-benzene | 90–110 | 489 |
| Higher chlorinated products | Residue | 250 |

The first two fractions in the above table, upon treatment with alcoholic potash were converted to side-chain chloro-substituted styrenes which were converted to benzoic acid on oxidation with dichromate, thus demonstrating the absence of nuclear-chlorinated products. The first fraction was found to consist of a mixture of alpha-alpha and alpha-beta-dichloroethylbenzenes, whilst the second fraction was a mixture of alpha-alpha-beta- and alpha-beta-beta-trichloroethylbenzenes.

The products obtained by the chlorination process according to our invention are valuable intermediary products for the production of chlorinated styrenes which may be used for the production of polymeric substances.

What we claim is:

1. A process for the manufacture of chlorinated derivatives of alpha-chloroethyl benzene which comprises reacting a benzenoid compound of the class consisting of alpha-chloroethyl benzene and nuclear chlorine substitution products thereof in the liquid phase with gaseous chlorine at a temperature between —10° C. and 30° C. in the presence of iodine as chlorination catalyst, the iodine being used in an amount of about 0.12 to 0.5% by weight of said benzenoid compound to produce alpha-chloroethyl benzene products having nuclear chloro substitution and chloro addition groups and converting at least one chloro addition product in the reaction mixture to the corresponding chlorine substituted chloroethyl benzene derivative by heat treatment at a temperature between 180 to 300° C.

2. A process in accordance with claim 1 in which the heat treatment is conducted under a pressure of 150 to 200 mm. of mercury.

3. A process in accordance with claim 1 in which the heat treatment is carried out after removal of unreacted benzenoid compounds of the class mentioned.

4. A process for the manufacture of chlorinated derivatives of alpha-chloroethyl benzene which comprises reacting a benzenoid compound of the class consisting of alpha-chloroethyl benzene and nuclear chlorine substitution products thereof in the liquid phase with gaseous chlorine at a temperature between —10° C. and 30° C. in the presence of iodine as chlorination catalyst, the iodine being used in an amount of about 0.12 to 0.5% by weight of said benzenoid compound to produce alpha-chloroethyl benzene having nuclear chloro substitution and chloro addition groups and feeding the reaction mixture continuously into a zone which is maintained at a temperature between 180 and 300° C. and removing the dehydrohalogenated chloro substituted benzene derivative commensurate with the feed.

5. A process for the manufacture of chlorinated derivatives of alpha-chloroethyl benzene which comprises heating a chloro addition compound of alpha-chloroethylchlorobenzene at a temperature of 180 to 300° C. and removing hydrochloric acid to produce the corresponding alpha-chloroethyl-chlorobenzene.

6. A process in accordance with claim 5 in which the heating is conducted under a pressure of 150 to 200 mm. of mercury.

EUGEN GOTTFRIED GALITZENSTEIN.
CYRIL WOOLF.

REFERENCES CITED

The following references are of record in the file of this patent:

UNITED STATES PATENTS

| Number | Name | Date |
|---|---|---|
| 2,193,823 | Levine et al. | Mar. 19, 1940 |

OTHER REFERENCES

Ellis: "Chemistry of Petroleum Derivatives," vol. 1, page 780 (1934).

Van der Linden: "Ber. der. deut. chem. Gesell.," vol. 45, pages 239–247 (1912).

Beilstein et al.: "Annalen," vol. 146, pages 320–1 (1868).

Ushakov et al.: "Chemical Abstracts," vol. 39, page 916 (1945).